(12) United States Patent
Bilis

(10) Patent No.: US 9,816,541 B2
(45) Date of Patent: Nov. 14, 2017

(54) BEDSTEAD FASTENING DEVICE

(71) Applicant: Ioannis Bilis, Korydallos Attikis (GR)

(72) Inventor: Ioannis Bilis, Korydallos Attikis (GR)

( * ) Notice: Subject to any disclaimer, the term of this patent is extended or adjusted under 35 U.S.C. 154(b) by 217 days.

(21) Appl. No.: 14/785,111

(22) PCT Filed: Apr. 19, 2013

(86) PCT No.: PCT/GR2013/000022
§ 371 (c)(1),
(2) Date: Oct. 16, 2015

(87) PCT Pub. No.: WO2014/170701
PCT Pub. Date: Oct. 23, 2014

(65) Prior Publication Data
US 2016/0153484 A1    Jun. 2, 2016

(51) Int. Cl.
*F16B 12/56*    (2006.01)
*F16B 12/22*    (2006.01)
(Continued)

(52) U.S. Cl.
CPC ............ *F16B 12/56* (2013.01); *A47C 19/005* (2013.01); *A47C 19/021* (2013.01); *F16B 12/22* (2013.01); *F16B 5/07* (2013.01)

(58) Field of Classification Search
CPC ................ A47C 19/021; A47C 19/005; Y10T 403/7094; A47B 47/00; F16B 12/00;
(Continued)

(56) References Cited

U.S. PATENT DOCUMENTS 1,537,459 A * 5/1925 Campbell ............... F16B 12/22
403/231
2,160,174 A * 5/1939 Scalera ................... F16B 12/60
5/296
(Continued)

FOREIGN PATENT DOCUMENTS

CN    201 547 086 U    8/2010
CN    201 739 284 U    2/2011
DE    10 2009 023 213 A1    2/2011

OTHER PUBLICATIONS

DE 10 2009 023 213 A1 English Abstract.
CN 201 739 284 U English Abstract.
CN 201 547 086 U English Abstract.

*Primary Examiner* — Daniel Wiley
(74) *Attorney, Agent, or Firm* — Ladas & Parry LLP

(57) ABSTRACT

A bed fastening device providing connection of the components in a bed structure, including a first mating part and a second mating part correspondingly mounted proximally to one end of bed components. The first mating part includes an elongate parallelepipedal plastic item with equidistantly spaced planar partition walls extending into side housings of tubular members, openings being provided in between sequential partition walls and side housings. The second mating part includes an elongate planar base plastic item with perpendicularly oriented, equidistantly spaced tubular members provided with side extensions. Engagement of the mating parts and of the bed fastening device and accordingly of bed components takes place with the introduction of tubular members of the mating parts within the openings of mating parts and the vertical downward displacement of the mating parts.

8 Claims, 6 Drawing Sheets

(51) Int. Cl.
*A47C 19/00* (2006.01)
*A47C 19/02* (2006.01)
*F16B 5/07* (2006.01)

(58) Field of Classification Search
CPC .......... F16B 12/22; F16B 12/54; F16B 12/56; F16B 12/58
See application file for complete search history.

(56) References Cited

U.S. PATENT DOCUMENTS

| | | | | |
|---|---|---|---|---|
| 2,707,788 | A * | 5/1955 | Ball | F16B 12/60 5/296 |
| 3,171,140 | A * | 3/1965 | Gutner | A47C 19/22 211/134 |
| 3,305,880 | A | 2/1967 | Cloutier | |
| 3,780,386 | A | 12/1973 | Fouks et al. | |
| 3,999,878 | A * | 12/1976 | Robinson | F16B 12/46 403/231 |
| 4,189,796 | A * | 2/1980 | Gutner | A47C 21/08 248/222.11 |
| 5,758,988 | A | 6/1998 | Theodorou | |
| 5,893,617 | A * | 4/1999 | Lee | A47B 47/0041 108/158.13 |
| 2008/0213040 | A1* | 9/2008 | Morze-Reichartz | E04B 1/2604 403/381 |

\* cited by examiner

BEDSTEAD FASTENING DEVICE

RELATED APPLICATION

This application is a national phase entry under 35 USC 371 of International Patent Application No PCT/GR2013/000022 filed on 19 Apr. 2013, the disclosures of which are incorporated in their entirety by reference herein.

THE FIELD OF THE ART

The present invention is directed to a bedstead fastening device adapted to provide secure attachment and support of bed component parts, i.e. of the rails forming the bedstead and of the bedstead and headboard.

THE BACKGROUND OF THE INVENTION

It is commonly known that a variety of fastening means are employed in the interconnection of the rails forming the bedstead, i.e. the frame of a bed structure and in latching the bedstead to the headboard of the bed, such fastening means being applied at the corner posts to interlock one fastening member mounted onto the side rail and extending forwardly thereof with another fastening member mounted onto an adjacent side rail or onto the headboard. A load-bearing capacity of the fastening members is required in respect of them exhibiting a sufficient strength and rigidity so as to provide adequate support against gravity.

Metallic hook members are commonly employed in such fastening process of a bed frame onto the headboard. It has been observed that usage of the bed eventually leads to deterioration of such fastening means that is being established by the bed becoming generally unsteady due to loose, creaky interconnection of such metallic hook members that in turn results to a noisy bed supporting function as a person lies and moves onto the bed structure.

One reason of such inadequate load bearing capacity is the fact that the load of the bedstead, of the mattress and of the persons lying thereupon is being received by load bearing members exhibiting a rather small loaded surface area that results to excessive forces being applied thereupon. By way of example U.S. Pat. No. 3,780,386 or U.S. Pat. No. 3,305,880 disclose a mechanical fastener for a bed frame comprising a pair of sheet metal hook means being supported by a pair of supporting pins, the latter obviously exhibiting an obviously small surface area that is henceforth being disposed to receiving an undesirably excessive force. Furthermore it is not even certain in the assembly of such a fastening member if both abovementioned supporting pins are substantially equally loaded so as receive and share an equivalent load of the bed being supported. If therefore a slight misalignment occurs in the assembly of a bed structure, this may lead to excessive loading of one component of the bed fastening relative to another that may lead to its inefficient performance and rapid wear. Thus, bed fastenings of the prior art exhibit a drawback of non-equivalent loading of each one of the load sharing components in each one of the fastenings being employed and accordingly of non-equivalent loading of the four fastenings being employed at the four corner posts of the bedstead.

On the other hand, it is also possible that such hook members get in an undesirably tight interlocking connection that dismantling thereof when disassembly of the bed is required becomes difficult. Furthermore, besides from employment of bolts for mounting such hook members on the bed rail and the headboard respectively, further connector accessories are often required for fixedly holding them in engagement condition.

It is further also noted that such bedstead fastening devices of the prior art lack means of providing a signal to the person carrying out assembly of the bed structure in confirmation of attainment of the nominal predetermined engagement condition, such lack of signaling attainment of the nominal predetermined engagement condition leading to possibilities of misaligned, erroneous engagement that will undoubtedly soon lead to a creaky, noisy connection and a deficient performance of the bed fastening. The prior art fastening devices operate in a fashion of attainment of the engagement condition of the mating parts of the fastening in a single step, whilst a secure engagement would require a first step of bringing the mating parts into engagement position, thereafter progressively tightening to ensure a securely fixed connection thereof. Furthermore the prior art does not teach means of automatically and securely locking the fastenings in their engagement condition and therefore appropriately unlocking the same when dismantling of a bed structure is required.

SUMMARY OF THE INVENTION

It is the object of the present invention to provide a bedstead fastening device adapted to provide secure attachment and support of bed component parts, i.e. of the rails forming the bedstead and of the bedstead and headboard, wherein the proposed bed fastening device is made from plastic raw material and is characterized in that it provides a noise-free secure attachment of the bed components, wherein the four fastening devices at each one of the four corner posts of the bedstead are adapted to receive equivalent loads and each fastening device is adapted to be equivalently loaded in each one of a plurality of load receiving members and wherein a pair of mating parts in each fastening device are being progressively tightened when being brought in an engagement condition and means is provided in each one of the fastening devices for securely locking the fastening in the finally attained engagement condition and accordingly for appropriately unlocking the same when dismantling of a bed structure is required, such means also adapted to provide an audio signal confirming attainment of the nominal predetermined engagement condition and averting possibilities of misaligned, erroneous engagement that will undoubtedly soon lead to a creaky, noisy connection and a deficient performance of the bed fastening.

In accordance with a preferred embodiment of the present invention, the fastening device comprises a pair of mating parts, a first mating part comprising an elongate parallelepipedal block being configured with a pair of identically small parallel rectangular sides and four elongate sides, said parallelepipedal block being divided in the elongate direction into a plurality of consecutive compartments by means of equidistantly spaced planar partition walls identically similar and parallel to the pair of identically small rectangular sides, each one of the equidistantly spaced planar partition walls being provided with a side housing of an equivalent plurality of tubular members adapted to receive bolt means for fixedly mounting the parallelepipedal block onto a first one of a pair of mating members of a bedstead arrangement, wherein each side housing comprises a tapered side and a second mating part comprising an elongate planar base provided with a plurality of equidistantly spaced holes adapted to receive bolt means for fixedly mounting the planar base onto a second one of the abovementioned pair of mating members of the bedstead arrangement, a plurality of equidistantly spaced tubular members extending on one side of the planar base in between the abovementioned equidistantly spaced holes thereof, said tubular members adapted to receive further bolt means for fixedly mounting the planar base onto the second one of the abovementioned pair of mating members of the bedstead arrangement, each tubular member being provided with a side extension with a rectangular configuration comprising one tapered side, said pair of mating parts of the bedstead fastening device being brought in engagement condition as said tubular members of the second mating part are being introduced within gaps provided in between the abovementioned planar partition walls and side housings provided thereupon in the first mating part so that the tapered sides of the side extensions of the second mating part abut and slide onto the tapered sides of the side housings of the first mating part until a horizontally oriented side of the tubular members of the second mating part abuts onto a horizontally oriented side of the side housings of the first mating part, whereby a securely firm engagement of the first and second mating parts of the bedstead fastening device has been obtained.

In accordance with a preferred embodiment of the invention, a flexible planar strip extension is provided at the bottom of the lowermost tubular member of the second mating part, such flexible planar strip extension being provided with a protruding bulge, said flexible planar strip extension being oriented downwardly the bottom of the elongate planar base constituting said second mating part, an end edge of the bottom of the first mating part being adapted to slide in contact with said flexible planar strip extension of the second mating part as the bed fastening device is being led in engagement condition, an audio signal being produced in verification of attainment of the engagement condition as said end edge of the bottom of the first mating part abuts onto said extending protruding bulge of said flexible planar strip extension of the second mating part.

BRIEF DESCRIPTION OF THE DRAWINGS

The invention will be best understood by those skilled in the art by reference to the accompanying drawings in which.

DESCRIPTION OF PREFERRED EMBODIMENTS OF THE INVENTION

The invention relates to a bed fastening device used in connecting together the components of a bed structure, such components comprising a pair of side rails extending in the longitudinal direction of the bed structure and a pair of side rails extending in the transverse direction thereof. The four side rails are connected at the four corner posts of the bed structure with an equivalent number of bed fastening devices. In a common bed structure all such side rails have the same configuration and they only differ in their length dimension with the transversal side rails having a length smaller than the longitudinal ones. Often one of the side rails extending in the transverse direction is being configured as a headboard being located at the top of the bed and extending above the level of the mattress. The drawings show the bed fastening device of the invention that comprises a first mating part 1 and a second mating part 2 with the first mating part 1 being mounted proximally to one end of one of the relatively longer side rails 10 extending in the longitudinal direction of the bed and with the second mating part 2 being mounted onto the headboard 20 of the bed and proximally to one end thereof.

Figure 1:
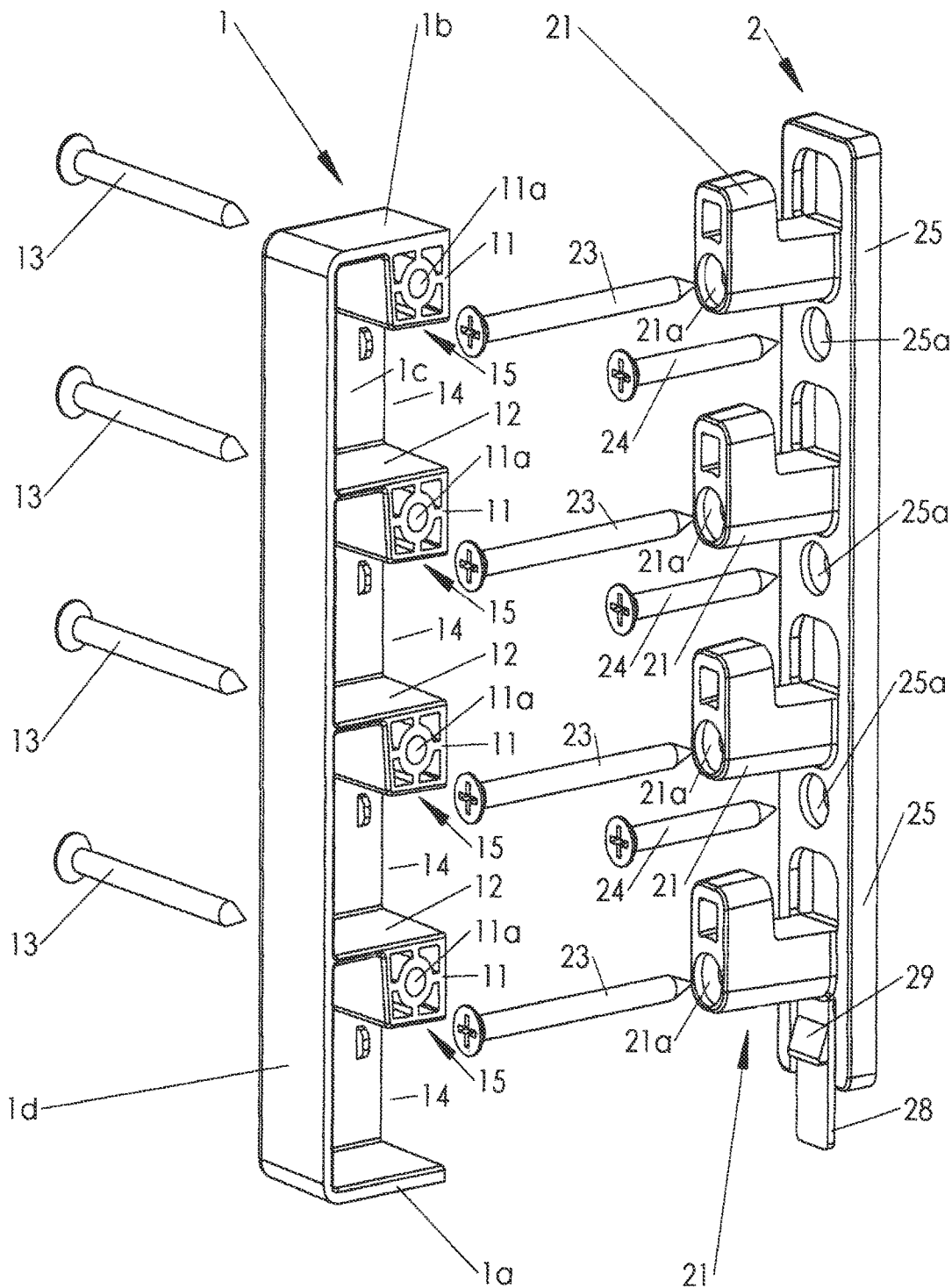
FIG. 1 shows an exploded perspective view of the first and second mating parts of the bed fastening device of the invention including the bolts employed in fixedly mounting the same onto a pair of first and second mating members of a bedstead arrangement.

As shown in FIG. 1, the bed fastening device of the invention comprises a pair of the first mating part 1 and the second mating part 2, both of which are made from plastic raw material with a scope of providing a noise-free secure attachment of the bed components.

In accordance with a preferred embodiment of the present invention, the first mating part 1 of the bed fastening device comprises an elongate parallelepipedal block being configured with a pair of identically small parallel rectangular sides 1$a$, 1$b$ and a pair of perpendicularly oriented elongate sides 1$c$ and 1$d$. A further pair of elongate sides that would have been correspondingly opposing to the abovementioned elongate sides 1$c$ and 1$d$ is being left open. The parallelepipedal block of the first mating part 1 is divided in the elongate direction into a plurality of consecutive compartments by means of equidistantly spaced planar partition walls 12 identically similar and parallel to the pair of identically small rectangular sides 1$a$ and 1$b$. Each one of the equidistantly spaced planar partition walls 12 is provided with a side housing 15 of an equivalent plurality of tubular members 11, a first side housing being located underneath surface 1$b$ of the parallelepipedal block, that is being oriented in a substantially vertical direction, and all further side housings being sequentially provided underneath the sequential partition walls 12 thereof. Openings 14 are provided in between the equidistantly spaced planar partition walls 12 and side housings 15 allowing entrance of tubular members of the second mating part 2 of the fastening device of the invention as will be explained hereinafter.

Figure 2:
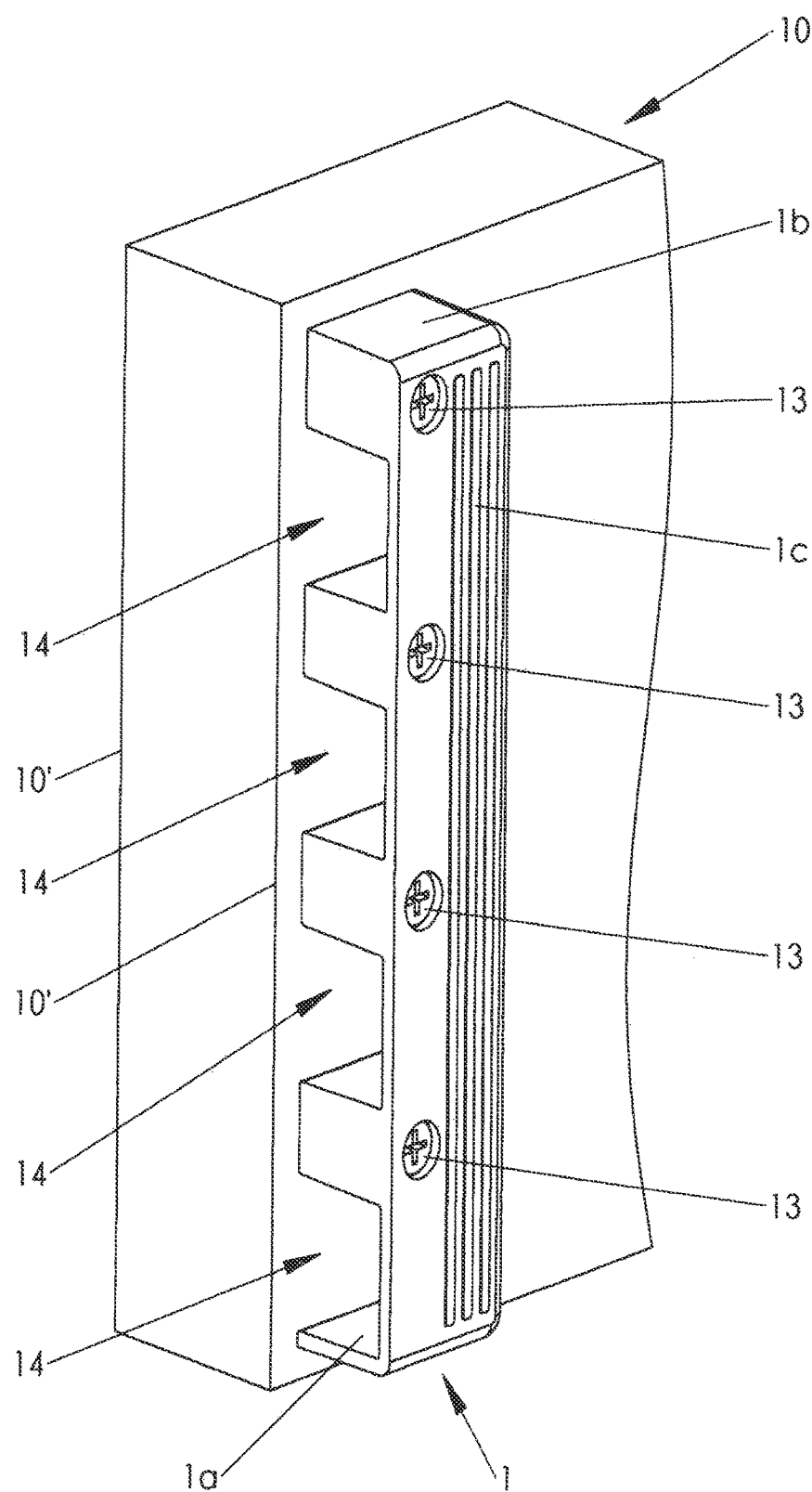
FIG. 2 shows a perspective view of the first mating part of the bed fastening device mounted at the corner post of a typical bed side rail.

Each side housing 15 is being adapted to receive bolt means 13 passing through a through opening 11$a$ of the tubular member 11 thereof for fixedly mounting the parallelepipedal block onto a first one of a pair of mating members of a bedstead arrangement and in particular proximally to the end of a side rail 10 extending in the longitudinal direction of the bed structure as shown in FIG. 2.

Figure 3:
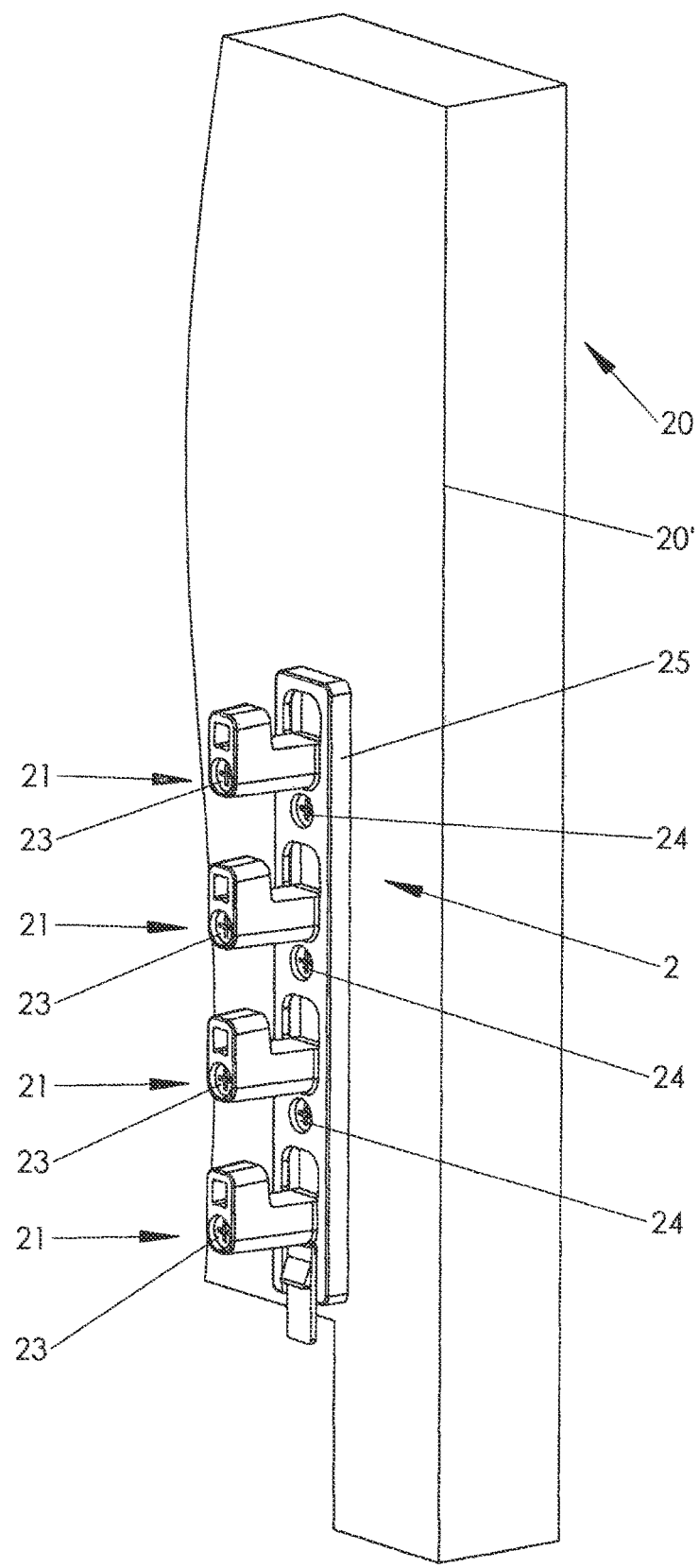
FIG. 3 shows a perspective view of the second mating part of the bed fastening device mounted at the corner post of a typical headboard.

The second mating part 2 of the bed fastening device of the invention comprises an elongate planar base 25 provided with a plurality of equidistantly spaced holes 25$a$ adapted to receive bolt means 24 for fixedly mounting the planar base 25 oriented in a substantially vertical direction onto a second one of the abovementioned pair of mating members of the bedstead arrangement and in particular onto a headboard component and proximally to the end thereof as depicted in FIG. 3.

It is in this respect noted that the distance of this vertically oriented second mating part 2 of the bed fastening device from an edge 20' at the end of the headboard component 20 is equivalent to the thickness of the longitudinally extending side rail component 10. Accordingly the distance of the vertically oriented first mating part 1 of the bed fastening device from an edge 10' at the end of the side rail component 10 is equivalent to the thickness of the planar base 25 of the second mating part 2 of the bed fastening device. With the mating parts 1, 2 of the bed fastening device mounted onto the corresponding mating bed components 10, 20 in the mode described hereinabove, when these are brought in engagement condition, the longitudinally extending side rail component 10 will abut onto the headboard component 20, level with the adjacently located second mating member 2 mounted thereupon and will at the same time extend so that its exterior side is level with the exterior side of the headboard component 20 and its edge 10' coincides with the edge 20' of the headboard component 20 as illustrated in the detail of the assembled fastening device shown in FIG. 5.

The second mating part 2 of the bed fastening device further comprises a plurality of equidistantly spaced tubular members 21, which are perpendicularly oriented with respect to the planar base 25 and extend on one side thereof in between the abovementioned equidistantly spaced holes 25a. These tubular members 21 comprise through openings 21a being adapted to receive further bolt means 23 for fixedly mounting the planar base 25 onto the second one of the abovementioned pair of mating members of the bedstead arrangement and in particular onto a typical headboard member 20 as shown in FIG. 3.

Each tubular member 21 of the mating part 2 of the bed fastening device of the invention is provided with a side extension, this side extension having a generally rectangular and in accordance with a preferred embodiment of the invention a trapezoidal configuration comprising one tapered side 26, whilst a flat surface 27 of the tubular member 21 lies underneath the abovementioned tapered side 26 of the side extension having a trapezoidal configuration, such flat surface 27 having a substantially horizontal orientation as the mating part 2 is vertically oriented onto the headboard member 20 of the bed structure.

Accordingly, each side housing 15 of the mating part 1 of the bed fastening device of the invention also has a generally rectangular and preferably a trapezoidal configuration comprising one tapered side 16, whilst a flat surface 17 thereof lies underneath the abovementioned tapered side 16 and has a substantially horizontal orientation as the mating part 1 of the bed fastening device is vertically oriented onto the side rail member 10 of the bed structure.

Figure 4:
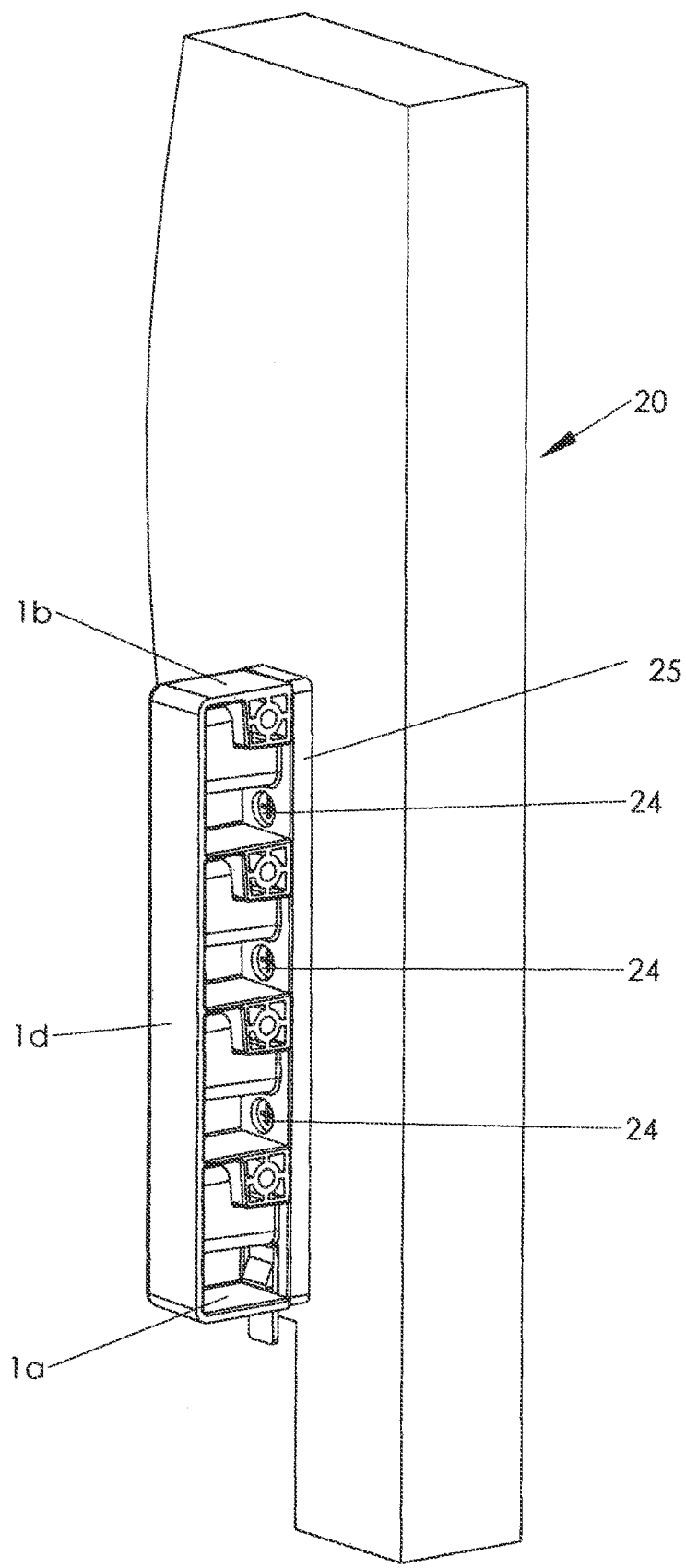
FIG. 4 shows a perspective view of the typical headboard of FIG. 3 with the second mating part of the bed fastening device mounted thereupon and with the first mating part of the bed fastening device in an engagement condition.
Figure 5:
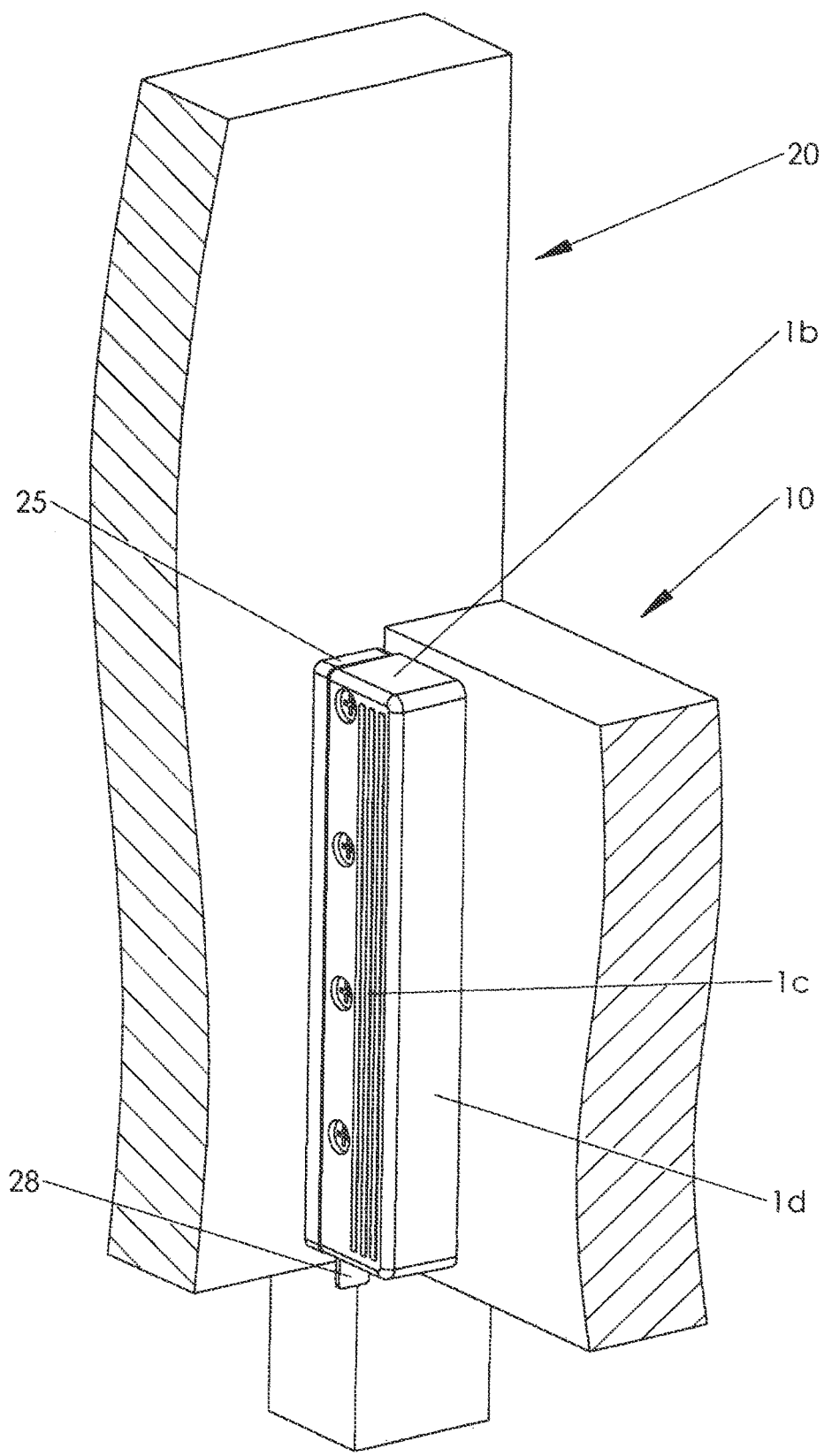
FIG. 5 shows a corner post of a bed structure wherein a bed side rail is connected to headboard by means of the bed fastening device of the invention being depicted in assembled condition.
Figure 6:
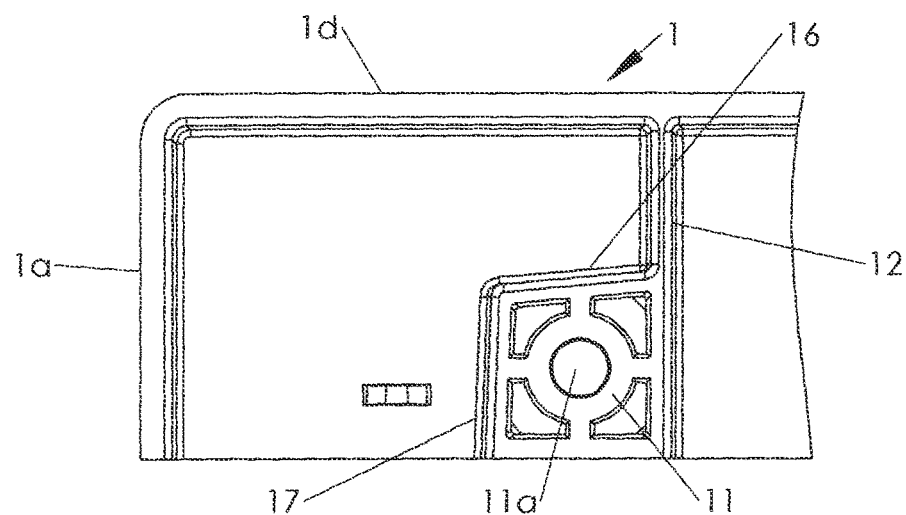
FIG. 6 shows a detail of the first mating part of the bed fastening device of the invention.
Figure 7:
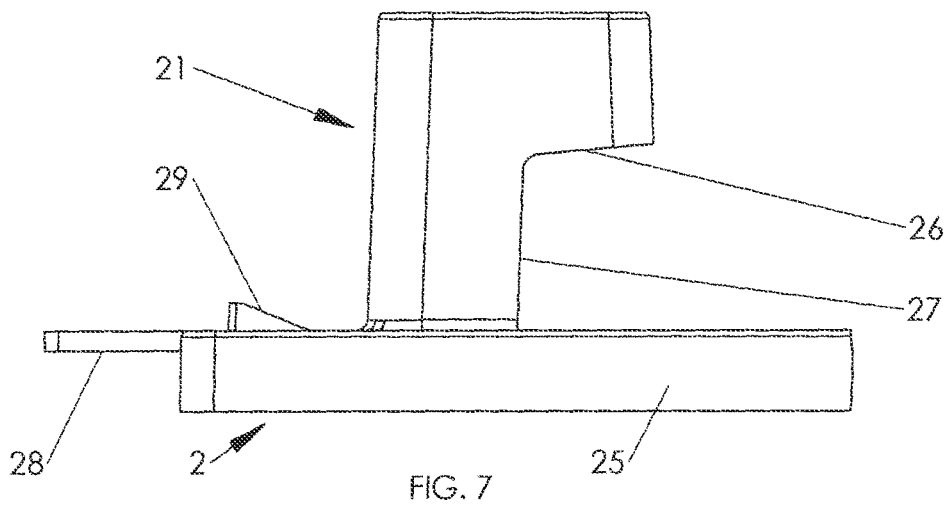
FIG. 7 shows a detail of the second mating part of the bed fastening device of the invention.

Engagement of the mating parts 1 and 2 of the bed fastening device and accordingly of bed components 10 and 20 takes place with bringing the side rail 10 with the first mating part 1 mounted thereupon (FIG. 2) in an appropriate position for effecting engagement of the bed fastening device, i.e. with the frontal surface of the side rail 10 abutting onto the surface of the headboard 20 adjacently to the mating part 2 of the fastening device mounted thereupon (FIG. 3) and with mating part 1 extending marginally above mating part 2 so as to bring the tubular members 21 thereof in a position allowing entrance within the openings 14 of mating part 1, displacing the side rail 10 in a transversal direction thereby effecting entrance of the tubular members 21 of mating part 2 within the openings 14 of mating part 1 and finally pushing the side rail 10 in a vertical downward direction so as to effect engagement of the mating parts 1 and 2 of the bed fastening device of the invention (FIGS. 4, 5). It is hereby noted that the bed fastening device of the invention ensures a secure, tight attachment of mating parts 1, 2 thereof and an equivalently distributed load in each one of the plurality of tubular members 21 of mating part 2 due to the progressively developing tightening as the tapered sides 26 of the side extensions of the second mating part 2 (FIG. 7) abut and slide onto the tapered sides 16 of the side housings of the first mating part 1 (FIG. 6), such process being concluded when the horizontally oriented sides 27 of the tubular members 21 of the second mating part 2 abut onto the corresponding horizontally oriented sides 17 of the side housings of the first mating part 1 (FIG. 8), whereby a securely firm engagement of the first and second mating parts of the bedstead fastening device has been obtained.

Figure 8:
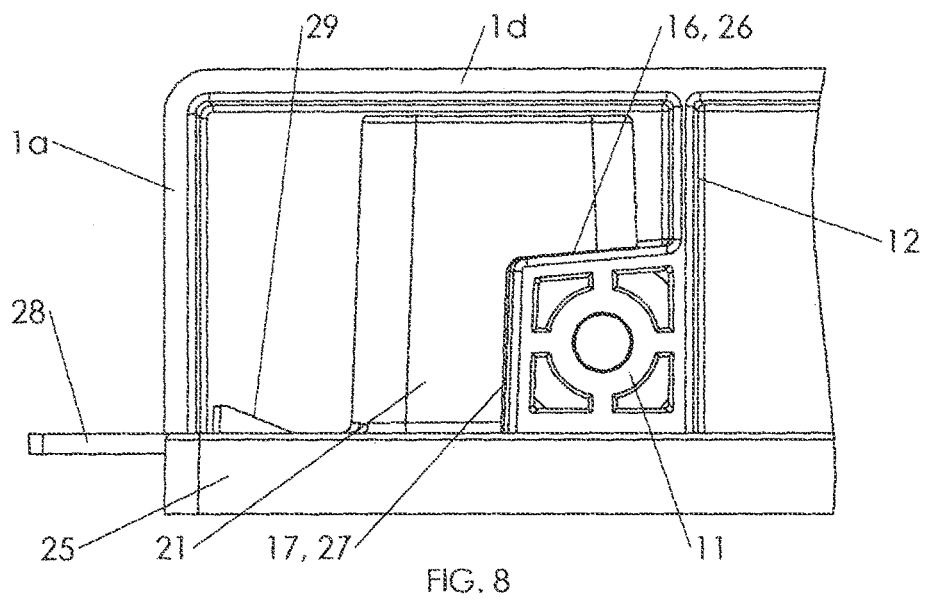
FIG. 8 shows a detail of the assembly of the first and second mating parts of the bed fastening device of the invention.

In accordance with a preferred embodiment of the invention, a flexible planar strip extension 28 is provided at the bottom of the elongate planar base 25 downwardly the lowermost tubular member 21 of the second mating part 2, such flexible planar strip extension 28 being provided with a protruding bulge 29. During the assembly of mating parts 1, 2 of the bed fastening device of the invention, an end edge of the bottom surface 1a of the first mating part 1 is being adapted to slide in contact with the flexible planar strip extension 28 of the second mating part as the bed fastening device is being led in engagement condition with the vertical downward displacement of part 1, whereby an audio signal is being produced in verification of attainment of the engagement condition as the end edge of the bottom surface 1a of the first mating part 1 jumps past the abovementioned protruding bulge 29 of the flexible planar strip extension 28 of the second mating part 2. Accordingly once the engagement condition has been reached the bed fastening device stands locked in place since the upward vertical movement of the first mating part 1 is obstructed by a frontal planar face of the protruding bulge 29 and when dismantling of the bed is required, a user must press downwardly the same flexible planar strip extension 28 that protrudes downwardly the assembled fastening device as shown in FIG. 5 or FIG. 8, thereby overcoming the obstacle imposed by the frontal planar face of the protruding bulge 29 and then proceed with releasing the engagement of mating parts 1 and 2 of the fastening device.

While hereinabove the invention has been described by reference to various preferred embodiments, it is to be appreciated that these are for illustrative purposes only and that those skilled in the art will realize that changes and modifications may be made thereto without departing from the spirit of the invention; it is therefore intended to include such changes and modifications falling within the scope of the invention.

The invention claimed is:

1. A bed fastening device adapted to provide connection of mating members in a bed structure, said mating members comprising a pair of first side rails (10) extending in the longitudinal direction of the bed structure and a pair of second side rails (20) extending in the transverse direction thereof, said bed fastening device comprising a first mating part (1) and a second mating part (2), said first mating part (1) being mounted proximally to one end of one of said first side rails (10) extending in the longitudinal direction of the bed and said second mating part (2) being mounted proximally to one end of one of said second side rails (20) extending in the transverse direction of the bed, characterized in that:

said first mating part (1) comprising an elongate parallelepipedal block plastic item being configured with a pair of identically small parallel rectangular lower and upper sides (1a, 1b) and a pair of perpendicularly oriented elongate sides (1c, 1d), a further pair of elongate sides correspondingly opposing said elongate sides (1c, 1d) being left open, a plurality of equidistantly spaced planar partition walls (12) identically similar and parallel to said pair of identically small rectangular sides (1a, 1b) dividing said parallelepipedal block in the elongate direction into a plurality of consecutive compartments, each one of said planar partition walls (12) being provided with a side housing (15) of a tubular member (11), a first side housing (15) being located underneath the upper side (1b) of the parallelepipedal block and each one of all further side housings (15) being located underneath the sequential said partition walls (12), openings (14) being provided in between said equidistantly spaced planar partition walls (12) and said side housings (15), each one of said side housings (15) having a trapezoidal configuration and comprising a tapered side (16) and a flat surface (17) lying underneath said tapered side (16) and having a substantially horizontal orientation as the first mating part (1) of the bed fastening device is vertically oriented onto the first side rails (10) of the bed structure;

said second mating part (2) comprising an elongate planar base (25) plastic item with a plurality of equidistantly spaced tubular members (21) perpendicularly oriented with respect to said planar base (25) and extending on one side thereof each one of said tubular members (21) being provided with a side extension having a trapezoidal configuration and comprising one tapered side (26), a flat surface (27) of said tubular member (21) lying underneath said tapered side (26) of said side extension, said flat surface (27) having a substantially horizontal orientation as the second mating part (2) is vertically oriented onto the second side rails (20) of the bed structure, wherein engagement of the mating parts (1) and (2) of the bed fastening device and accordingly of the first and second side rails takes place with the introduction of said tubular members (21) of said second mating part (2) within said openings (14) of said first mating part (1) and the vertical downward displacement of said first mating part (1) whereby said tapered sides (26) of the side extensions of said second mating part (2) abut and slide onto said tapered sides (16) of said side housings (15) of said first mating part (1), said fastening device being brought at an engagement condition as said horizontally oriented sides (27) of said tubular members (21) of the second mating part (2) abut onto the corresponding said horizontally oriented sides (17) of said side housings of the first mating part (1).

2. A method of assembly of a bed structure comprising a pair of first side rails (10) extending in a longitudinal direction of the bed structure and a pair of second side rails (20) extending in a transverse direction thereof with a bed fastening device as claimed in claim 1, said first mating part (1) being mounted proximally to one end of one of said first side rails (10) extending in the longitudinal direction of the bed structure and said second mating part (2) being mounted proximally to one end of the other of said second side rails (20) extending in the transverse direction of the bed structure, characterized in that engagement of the mating parts (1, 2) of the bed fastening device and accordingly of the first and second side rails (10, 20) comprises the steps of:

bringing a first side rail (10) with said first mating part (1) of the bed fastening device mounted thereupon in the proximity of a second side rail (20) with said second mating part (2) of the bed fastening device mounted thereupon, wherein a frontal surface of said first side rail (10) abuts onto said second side rail (20) adjacently to said second mating part (2) of the bed fastening device and said first mating part (1) extends marginally above said second mating part (2) of the bed fastening device, such that said tubular members (21) of said second mating part (2) are located in front of said openings (14) of said first mating part (1);

displacing the first side rail (10) in a transversal direction thereby effecting entrance of said tubular members (21) of said second mating part (2) within said openings (14) of said first mating part (1), and pushing the first side rail (10) in a vertical downward direction thereby effecting progressive engagement of said first and second mating parts (1, 2) of the bed fastening device and accordingly of said first and second side rails (10, 20) as said tapered sides (26) of the side extensions of said second mating part (2) abut and slide onto said tapered sides (16) of the side housings of said first mating part (1), the engagement being concluded when the horizontally oriented sides (27) of the tubular members (21) of said second mating part (2) abut onto the corresponding horizontally oriented sides (17) of the side housings of said first mating part (1).

3. The bed fastening device according to claim 1, characterized in that said tubular members (11) of said side housings (15) in said first mating part (1) are provided with through openings (11a), bolt means (13) being driven through said through openings (11a) for fixedly mounting the parallelepipedal block onto said first side rails (10) of the bed structure and in that said elongate planar base (25) in said second mating part (2) is provided with a plurality equidistantly spaced holes (25a) and said tubular members (21) are provided with through openings (21a), bolt means (23) being driven through said through openings (21a) and bolt means (24) being driven through said holes (25a) for fixedly mounting the planar base (25) onto said second side rails (20) of the bed structure.

4. A method of assembly of a bed structure comprising a pair of first side rails (10) extending in a longitudinal direction of the bed structure and a pair of second side rails (20) extending in a transverse direction thereof with a bed fastening device as claimed in claim 3, said first mating part (1) being mounted proximally to one end of one of said first side rails (10) extending in the longitudinal direction of the bed structure and said second mating part (2) being mounted proximally to one end of one of said second side rails (20) extending in the transverse direction of the bed structure, characterized in that engagement of the first and second mating parts (1, 2) of the bed fastening device and accordingly of the first and second side rails (10, 20) comprises the steps of:

bringing a first side rail (10) with said first mating part (1) of the bed fastening device mounted thereupon in the proximity of a second side rail (20) with said second mating part (2) of the bed fastening device mounted thereupon, wherein a frontal surface of said first side rail (10) abuts onto said second side rail (20) adjacently to said second mating part (2) of the bed fastening device and said first mating part (1) extends marginally above said second mating part (2) of the bed fastening device, such that said tubular members (21) of said second mating part (2) are located in front of said openings (14) of said first mating part (1);

displacing the first side rail (10) in a transversal direction thereby effecting entrance of said tubular members (21) of said second mating part (2) within said openings (14) of said first mating part (1), and pushing the first side rail (10) in a vertical downward direction thereby effecting progressive engagement of said first and second mating parts (1, 2) of the bed fastening device and accordingly of said first and second side rails (10, 20) as said tapered sides (26) of the side extensions of said second mating part (2) abut and slide onto said tapered sides (16) of the side housings of said first mating part (1), the engagement being concluded when the horizontally oriented sides (27) of the tubular members (21) of said second mating part (2) abut onto the corresponding horizontally oriented sides (17) of the side housings of said first mating part (1).

5. The bed fastening device according to claim 1, characterized in that said elongate planar base (25) in said second mating part (2) is provided with a flexible planar strip-extension (28) at the bottom thereof, said flexible planar strip extension (28) being provided with a protruding bulge (29), an end edge of the lower surface (1*a*) of the first mating part (1) being adapted to slide in contact with said flexible planar strip extension (28) of the second mating part (2) as the bed fastening device is being led in engagement condition with the vertical downward displacement of the first mating part (1), whereby an audio signal is produced in verification of attainment of the engagement condition as the end edge of the lower side (1*a*) of the first mating part (1) jumps past said protruding bulge (29) of said flexible planar strip extension (28) of the second mating part (2).

6. A method of assembly of a bed structure comprising a pair of first side rails (10) extending in a longitudinal direction of the bed structure and a pair of second side rails (20) extending in a transverse direction thereof with a bed fastening device as claimed in claim 5, said first mating part (1) being mounted proximally to one end of one of said first side rails (10) extending in the longitudinal direction of the bed structure and said second mating part (2) being mounted proximally to one end of one of said second side rails (20) extending in the transverse direction of the bed structure, characterized in that engagement of the first and second mating parts (1, 2) of the bed fastening device and accordingly of the first and second side rails (10, 20) comprises the steps of:

bringing a first side rail (10) with said first mating part (1) of the bed fastening device mounted thereupon in the proximity of a second side rail (20) with said second mating part (2) of the bed fastening device mounted thereupon, wherein a frontal surface of said first side rail (10) abuts onto said second side rail (20) adjacently to said second mating part (2) of the bed fastening device and said first mating part (1) extends marginally above said second mating part (2) of the bed fastening device, such that said tubular members (21) of said second mating part (2) are located in front of said openings (14) of said first mating part (1);

displacing the first side rail (10) in a transversal direction thereby effecting entrance of said tubular members (21) of said second mating part (2) within said openings (14) of said first mating part (1), and pushing the first side rail (10) in a vertical downward direction thereby effecting progressive engagement of said first and second mating parts (1, 2) of the bed fastening device and accordingly of said first and second side rails (10, 20) as said tapered sides (26) of the side extensions of said second mating part (2) abut and slide onto said tapered sides (16) of the side housings of said first mating part (1), the engagement being concluded when the horizontally oriented sides (27) of the tubular members (21) of said second mating part (2) abut onto the corresponding horizontally oriented sides (17) of the side housings of said first mating part (1).

7. The bed fastening device as claimed in claim 1, wherein one of said second side rails (20) extending in the transverse direction of the bed structure is configured as a headboard located at the top of the bed structure and extending above a level of a mattress.

8. A method of assembly of a bed structure comprising a pair of first side rails (10) extending in a longitudinal direction of the bed structure and a pair of second side rails (20) extending in a transverse direction thereof with a bed fastening device as claimed in claim 7, said first mating part (1) being mounted proximally to one end of one of said first side rails (10) extending in the longitudinal direction of the bed structure and said second mating part (2) being mounted proximally to one end of one of said second side rails (20) extending in the transverse direction of the bed structure, characterized in that engagement of the first and second mating parts (1, 2) of the bed fastening device and accordingly of the first and second side rails (10, 20) comprises the steps of:

bringing a first side rail (10) with said first mating part (1) of the bed fastening device mounted thereupon in the proximity of a second side rail (20) with said second mating part (2) of the bed fastening device mounted thereupon, wherein a frontal surface of said first side rail (10) abuts onto said second side rail (20) adjacently to said second mating part (2) of the bed fastening device and said first mating part (1) extends marginally above said second mating part (2) of the bed fastening device, such that said tubular members (21) of said second mating part (2) are located in front of said openings (14) of said first mating part (1);

displacing the first side rail (10) in a transversal direction thereby effecting entrance of said tubular members (21) of said second mating part (2) within said openings (14) of said first mating part (1), and pushing the first side rail (10) in a vertical downward direction thereby effecting progressive engagement of said first and second mating parts (1, 2) of the bed fastening device and accordingly of said first and second side rails (10, 20) as said tapered sides (26) of the side extensions of said second mating part (2) abut and slide onto said tapered sides (16) of the side housings of said first mating part (1), the engagement being concluded when the horizontally oriented sides (27) of the tubular members (21) of said second mating part (2) abut onto the corresponding horizontally oriented sides (17) of the side housings of said first mating part (1).

* * * * *